US010289218B1

United States Patent
Young (10) Patent No.: US 10,289,218 B1
(45) Date of Patent: May 14, 2019

(54) ENHANCED VIDEO SYSTEM CONTROL AND YOKE INTEGRATION

(71) Applicant: Rockwell Collins, Inc., Cedar Rapids, IA (US)

(72) Inventor: Bruce H. Young, Tigard, OR (US)

(73) Assignee: Rockwell Collins, Inc., Cedar Rapids, IA (US)

(*) Notice: Subject to any disclaimer, the term of this patent is extended or adjusted under 35 U.S.C. 154(b) by 85 days.

(21) Appl. No.: 15/252,334

(22) Filed: Aug. 31, 2016

(51) Int. Cl.
| | |
|---|---|
| *G09G 5/02* | (2006.01) |
| *G06F 3/0362* | (2013.01) |
| *G06F 3/0485* | (2013.01) |
| *G02B 27/01* | (2006.01) |
| *B64D 43/00* | (2006.01) |

(52) U.S. Cl.
CPC .......... *G06F 3/0362* (2013.01); *B64D 43/00* (2013.01); *G02B 27/0101* (2013.01); *G02B 27/0179* (2013.01); *G06F 3/0485* (2013.01); *G09G 5/02* (2013.01); *G02B 2027/014* (2013.01); *G02B 2027/0118* (2013.01)

(58) Field of Classification Search
CPC .... G09G 5/02; G09G 5/06; G09G 2320/0666; G09G 2340/06; G06T 11/001
USPC .......................................................... 345/589
See application file for complete search history.

(56) References Cited

U.S. PATENT DOCUMENTS

| | | | | |
|---|---|---|---|---|
| 6,330,497 | B1* | 12/2001 | Obradovich | B60G 17/0195 345/7 |
| 7,199,785 | B2* | 4/2007 | Ledbetter | G06F 3/0213 200/6 A |
| 7,982,767 | B2* | 7/2011 | Berson | B64D 47/08 348/144 |
| 8,542,918 | B2* | 9/2013 | Bryant | G06T 5/009 358/3.26 |
| 2009/0278765 | A1* | 11/2009 | Stringfellow | G02B 27/01 345/7 |
| 2010/0159898 | A1* | 6/2010 | Krzyzanowski | G06F 9/4445 455/414.1 |

OTHER PUBLICATIONS

Wood, R.B., and Howells, P. B. Head-up Display, 2001, [Online], {Retrieved Jan. 18, 2018]. Retrieved from the Internet <URL: http://www.davi.ws/avionics/TheAvionicsHandbook_Cap_4.pdf>.*

* cited by examiner

Primary Examiner — Gordon G Liu
(74) Attorney, Agent, or Firm — Angel N. Gerdzhikov; Donna P. Suchy; Daniel M. Barbieri (57) ABSTRACT

A display control system with a thumb wheel input device affixed to a yoke gives a pilot access to video from various sensors. Up and down inputs of the thumb wheel control the brightness of an image on the display while an inward click or depression click of the thumb wheel acts as the yoke clear switch. A directional click left or right may toggle image contrast inversion, cycle input sources, or execute other functionality associated with specific image sources.

11 Claims, 8 Drawing Sheets

ENHANCED VIDEO SYSTEM CONTROL AND YOKE INTEGRATION

BACKGROUND

Heads-up displays (HUD) have the ability to put a video image in front of a pilot from any of a plurality of sources and sensors. State of the art avionics systems include enhanced video systems (EVS) connected to multiple video sources, including two or three camera images that may be merged. The display from a Radar system or synthetic vision system (SVS), generated from an aircraft position and a terrain database, can be sent as a video image to the HUD. EVS, Radar, and SVS can be merged into a combined vision system (CVS). The Federal Aviation Administration (FAA) requires a pilot yoke clear switch to remove video images from the pilot's line of sight. Such switch cannot be off of the yoke, as the pilot must be able to de-select video when 200 feet off the ground and close to landing.

Beyond the yoke clear switch, control mechanisms for some enhanced video functions are de-centralized and off the yoke, hindering a pilot's ability to easily manipulate the display. It would be advantageous to have a control mechanism for HUD video inputs that is mounted to the yoke and allows the pilot easy access to EVS, SVS, and CVS type functionality in any of a plurality of image sources.

SUMMARY

In one aspect, embodiments of the inventive concepts disclosed herein are directed to a display control system with a control input affixed to a yoke to give a pilot access to enhanced functionality associated with various image sources and sensors.

A thumb wheel input device controls the brightness of an image displayed on the display while an inward click or depression click capability of the thumb wheel input device acts as the yoke clear switch.

In a further aspect, the thumb wheel input device includes directional click capabilities such as a left click and right click. A directional click input may toggle image contrast inversion, cycle input sources, or execute other functionality associated with specific image sources.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a display control system with a thumb wheel input device affixed to a yoke to give a pilot access to enhanced functionality associated with one or more video sources and sensors. The thumb wheel input device has a depression click capability acting as the yoke clear switch while the wheel rotation controls the brightness of an image displayed on the display.

Figure 1:
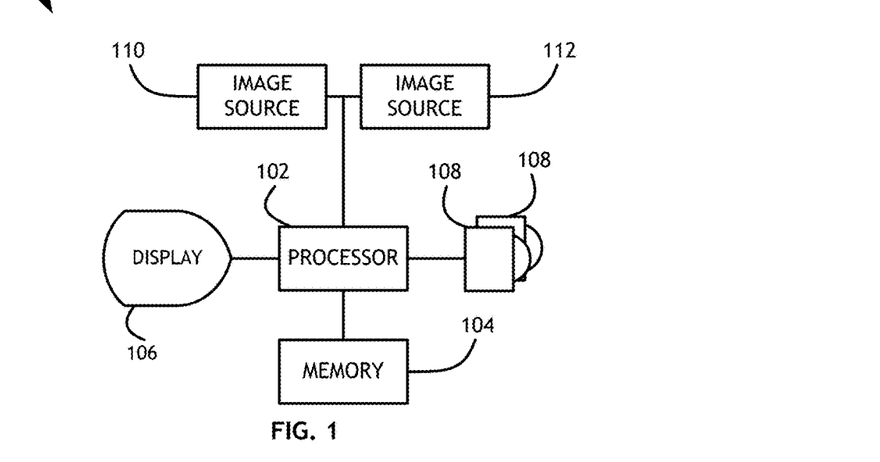
FIG. 1 shows a block diagram of an exemplary embodiment of a system according to the inventive concepts disclosed herein.
Figure 2:
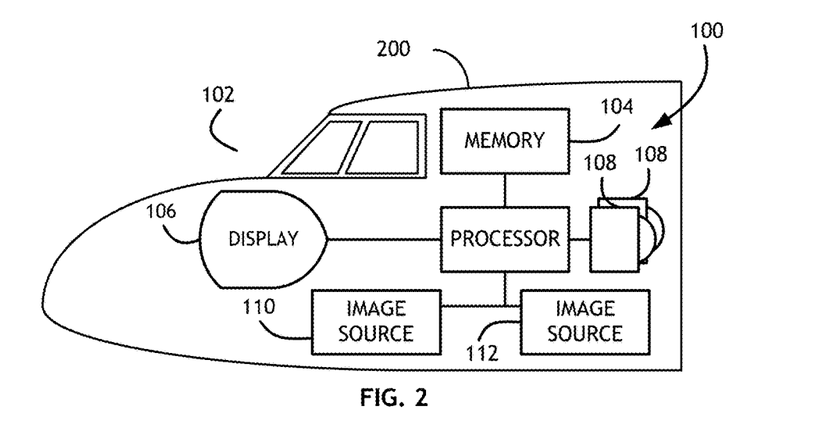
FIG. 2 shows a block diagram of an aircraft including an exemplary embodiment of a system according to the inventive concepts disclosed herein.

Referring to FIGS. 1 and 2, block diagrams of an exemplary embodiments of a system 100 and aircraft 200 according to the inventive concepts disclosed herein are shown. The system 100 includes a processor 102, a memory 104 connected to the processor 102 for storing processor executable program code, a display 106, such as a HUD, a windshield monitor, a display on an instrument panel, connected to the processor 102, and one or more thumb wheel input devices 108 connected to the processor 102. The one or more thumb wheel input devices 108 each provide a depression click capability which the processor 102 interprets to remove an image from the display 106, and rotate up and rotate down functions which the processor 102 interprets to increase and decrease the brightness of the images on the display 106 respectively.

The system 100 also includes one or more image sources 110, 112 connected to the processor 102. The one or more thumb wheel input devices 108 each provide a first directional click capability and a second directional click capability. The processor 102 may interpret the first directional click and the second directional click to cycle between available image sources 110, 112, including a combined image source. In some embodiments, each of the one or more thumb wheel input devices 108 is associated with a specific image source. Alternatively, each of the one or more thumb wheel input devices 108 is associated with a specific display 106.

In some embodiments, such image sources 110, 112 may have specific functional features such as infrared capability, contrast inversion, etc. The processor 102 may interpret a first directional click to cycle through available image sources 110, 112 while the processor 102 interprets a second directional click to cycle through available functional features specific to the current image source 110 or 112.

While embodiments described herein are generally directed toward thumb wheel input devices 108, other devices with similar functionality are envisioned. For example, some embodiments may comprise one or more spring biased thumb sticks constrained to horizontal or vertical deflection at one time. Some embodiments may comprise a touch sensitive device that is also capable of registering a depression click event.

Figure 3:
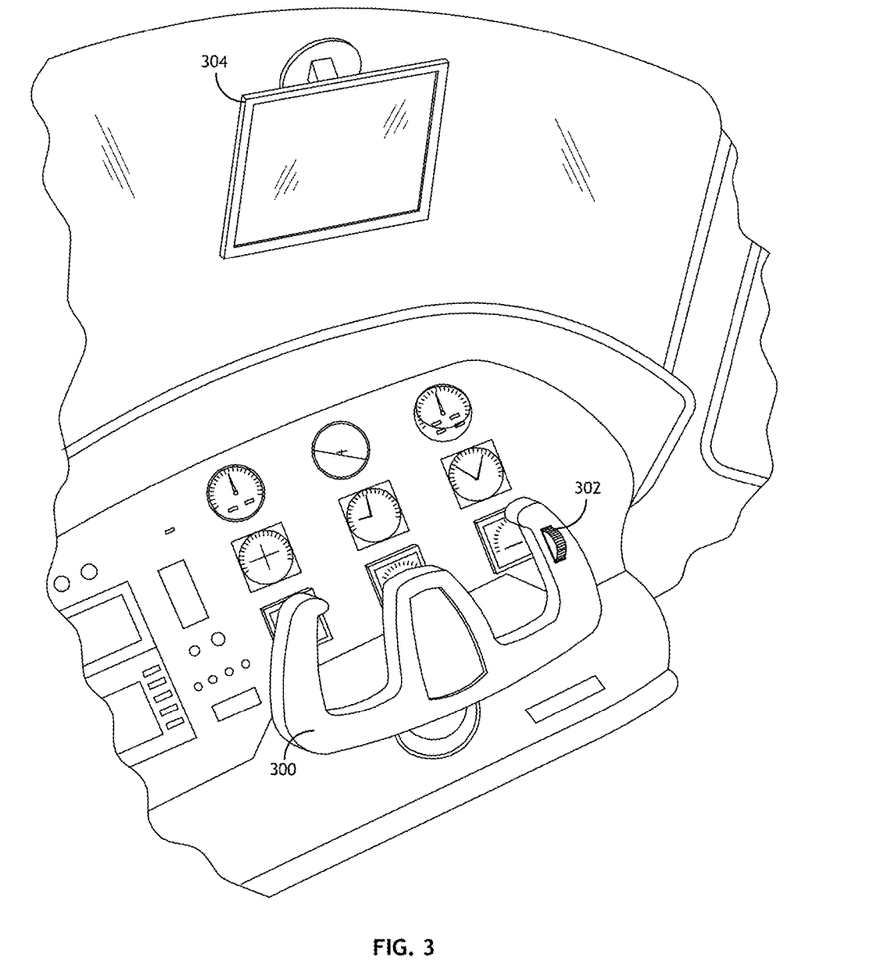
FIG. 3 shows an environmental view of an aircraft cockpit including an exemplary embodiment of the inventive concepts disclosed herein.
Figure 4:
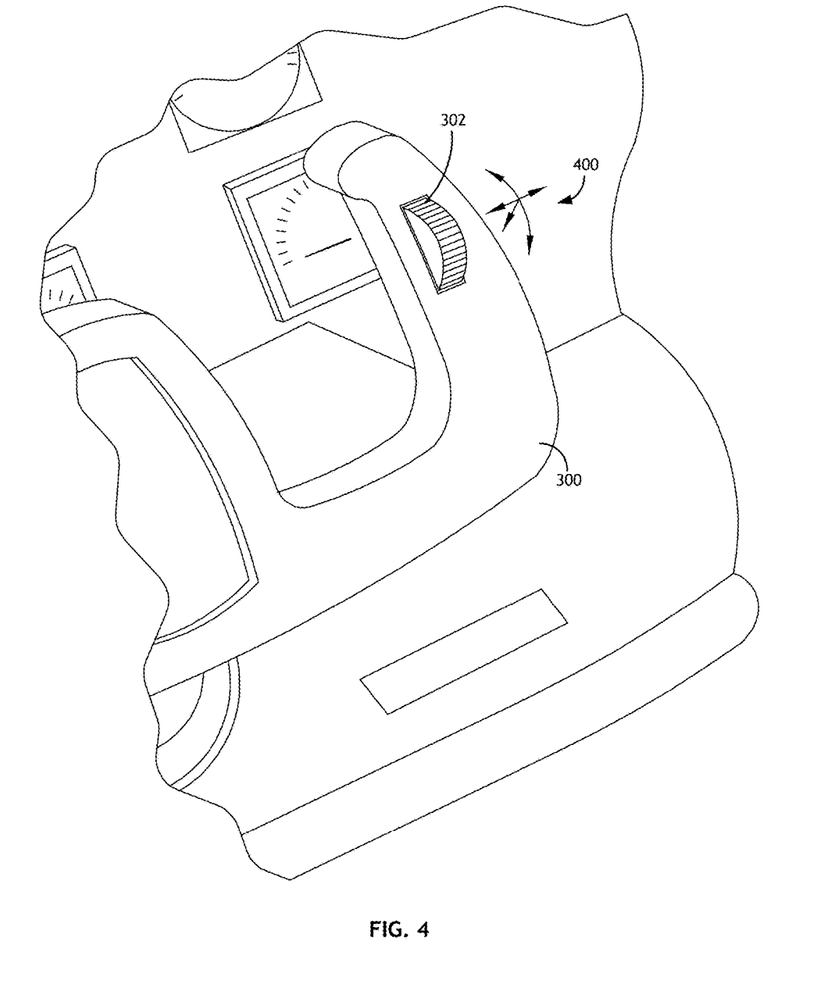
FIG. 4 shows a partial environmental view of an aircraft yoke useful for implementing an exemplary embodiment of the inventive concepts disclosed herein.

Referring to FIGS. 3 and 4, environmental views of an aircraft cockpit including an exemplary embodiment of the inventive concepts disclosed herein are shown. An aircraft cockpit includes an aircraft yoke 300 incorporating a thumb wheel input device 302 and a display 304. The thumb wheel input device 302 is capable of multiple input modalities 400. For example, the thumb wheel input device 300 has a depression click functionality in addition to rotate up and rotate down. In some embodiments, the thumb wheel input device 302 also has a first directional click functionality (such as right-click) and a second directional click functionality (such as left-click).

Figure 5A:
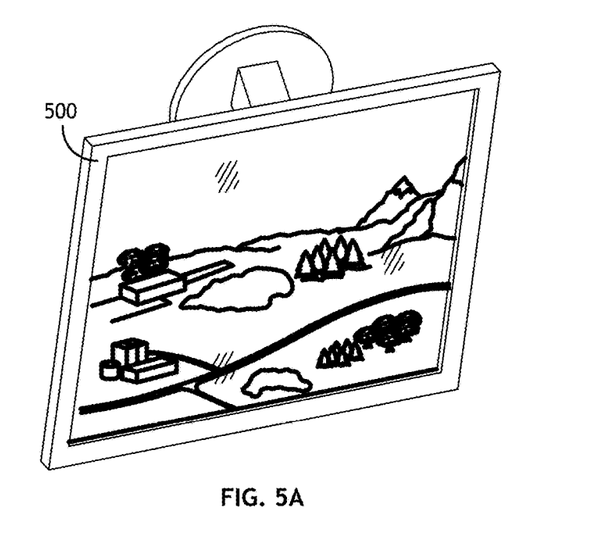
FIG. 5A shows a display implementing an exemplary embodiment of the inventive concepts disclosed herein to adjust display brightness.
Figure 5B:
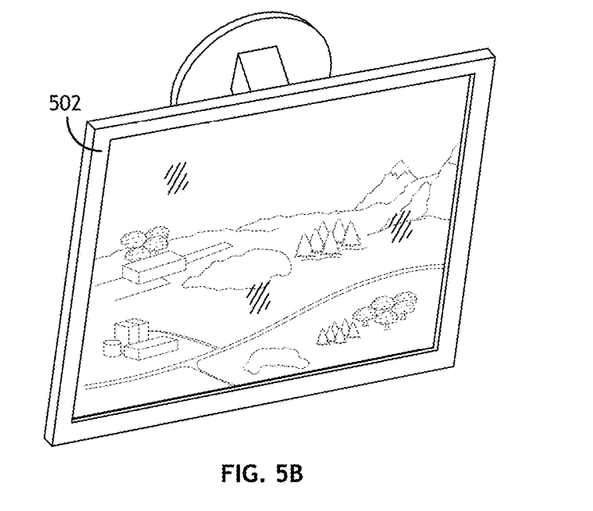
FIG. 5B shows a display implementing an exemplary embodiment of the inventive concepts disclosed herein to adjust display brightness.

Referring to FIGS. 5A and 5B, a display implementing an exemplary embodiment of the inventive concepts disclosed herein to adjust display brightness is shown. A processor receiving a rotate up event from a thumb wheel input device 108 on an aircraft yoke interprets the rotate up event as an instruction to increase brightness 500 of the display. Likewise, the processor receiving a rotate down event from the thumb wheel input device interprets the rotate down event as an instruction to decrease brightness 502 of the display.

Figure 6A:
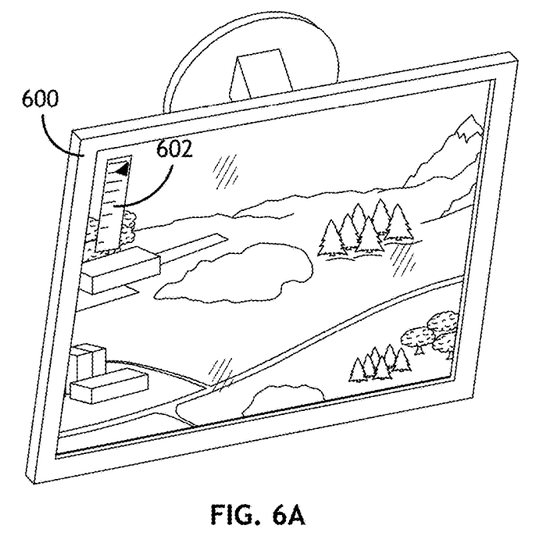
FIG. 6A shows a display implementing an exemplary embodiment of the inventive concepts disclosed herein to change image sources.
Figure 6B:
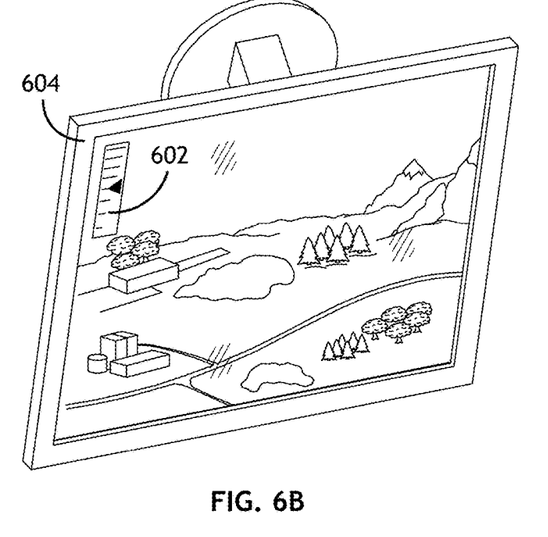
FIG. 6B shows a display implementing an exemplary embodiment of the inventive concepts disclosed herein to change image sources.

Referring to FIGS. 6A and 6B, a display implementing an exemplary embodiment of the inventive concepts disclosed herein to change image sources is shown. A processor receiving a first directional click event (such as a left click) from a thumb wheel input device on an aircraft yoke interprets the first directional click event as an instruction to isolate a first image source 600 from an ordered list 602 of available image sources. Subsequent first directional click events may cycle through image sources in the ordered list 602, where each image source contributes a portion of a composite image 604.

In some embodiments, the processor may interpret a second directional click event (such as a right click) as an instruction to cycle through the ordered list 602 in an opposite direction. In other embodiments, the processor may interpret the second directional click event as an instruction to restore the composite image 604.

Figure 7A:
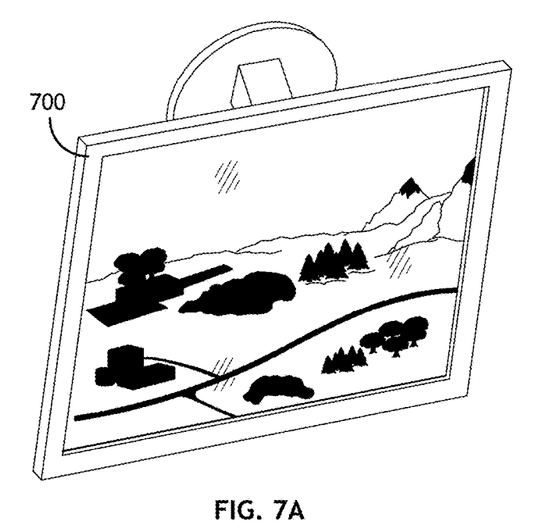
FIG. 7A shows a display implementing an exemplary embodiment of the inventive concepts disclosed herein to perform contrast inversion.
Figure 7B:
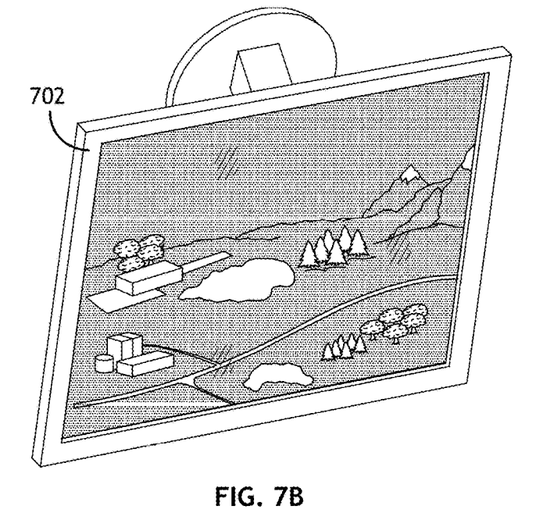
FIG. 7B shows a display implementing an exemplary embodiment of the inventive concepts disclosed herein to perform contrast inversion.

Referring to FIGS. 7A and 7B, a display implementing an exemplary embodiment of the inventive concepts disclosed herein to perform contrast inversion is shown. A processor receiving a directional click event from a thumb wheel input device on an aircraft yoke interprets the directional click event as an instruction to switch between a normal image 700 and an inverted contrast image 702.

In some embodiments, each of a plurality of image sources may be associated with specific functionality. Where a pilot cycles through image sources (such as in FIGS. 6A and 6B) via a first directional click event, the processor may identify specific functionality associated with a selected image source as it is selected, and actuate such special functionality via a second directional click event. Where the selected image source is associated with a plurality of special functions, subsequent second directional click events may cycle through all the available special functions.

Figure 8:
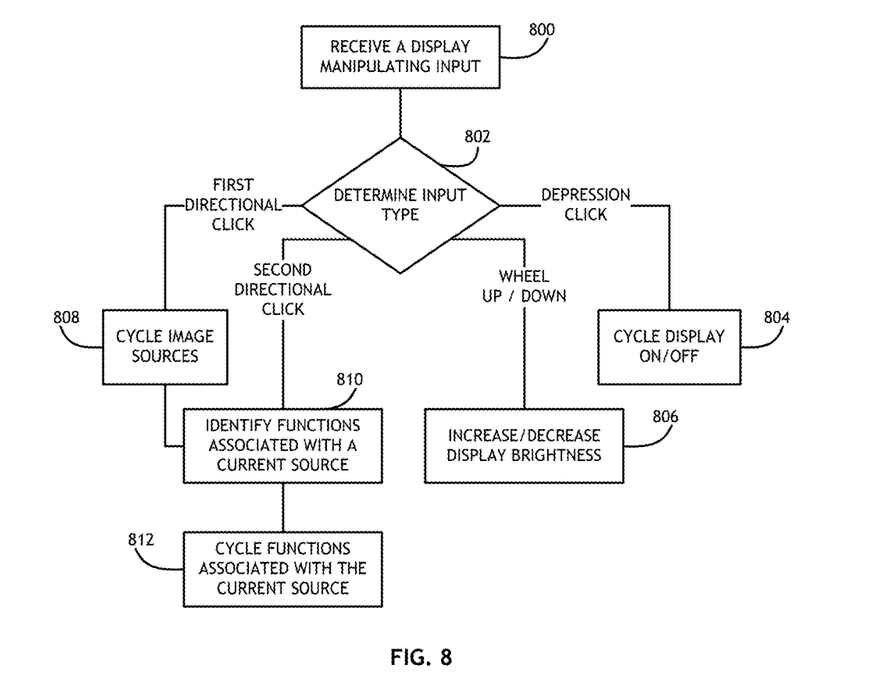
FIG. 8 shows a flowchart of an exemplary embodiment of a method for manipulating display features in a display according to the inventive concepts disclosed herein.

Referring to FIG. 8, a flowchart of an exemplary embodiment of a method for manipulating display features in a display according to the inventive concepts disclosed herein is shown. An input is received 800 from a multi-function thumb wheel input device and an input type is determined 802. Where the input type is a depression click, a corresponding display (such as a HUD) is cycled 804 on or off, or the image on the display is otherwise removed. Where the input type is a rotate up event or a rotate down event, the brightness of the display is increased or decreased 802 accordingly.

Where the input type is determine 802 to be a first directional click event, the display is cycled 808 through available image sources to establish a current image source; subsequent first directional click events further cycles through available image sources. Where the input type is determined 802 to be a second directional click event, all available functions associated with the current image source are identified 810 and cycled 812 through, with each subsequent second directional click event, actuating each function accordingly.

Figure 9:
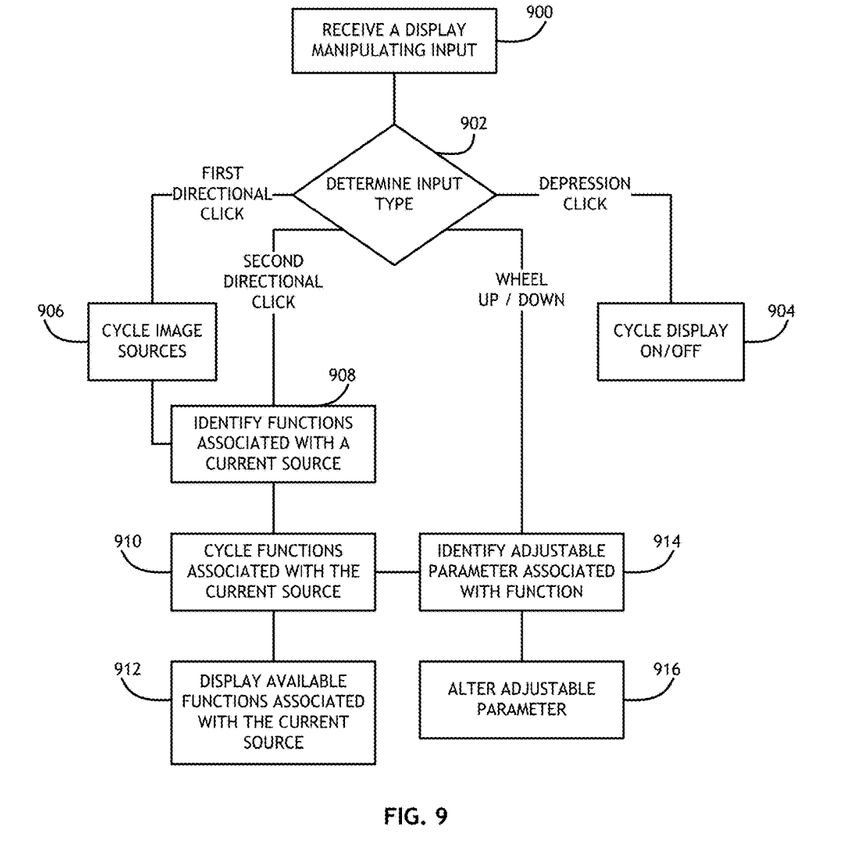
FIG. 9 shows a flowchart of an exemplary embodiment of a method for manipulating display features in a display according to the inventive concepts disclosed herein.

Referring to FIG. 9, a flowchart of an exemplary embodiment of a method for manipulating display features in a display according to the inventive concepts disclosed herein is shown. An input is received 900 from a multi-function thumb wheel input device and an input type is determined 902. Where the input type is determined 902 to be a depression click, the corresponding display (such as a HUD) is cycled 904 to remove or display a signal from a current image source. Further, where multiple image sources are utilized to create a composite image, the depression click event may be interpreted to isolate and remove a single image source from the composite image.

Where the input type is determined 902 to be a first directional click event, available image sources are cycled 906 through to establish a current image source; subsequent first directional click events further cycle through available image sources. Where the input type is determined 902 to be a second directional click event, all available functions associated with the current image source are identified 908 and cycled 910 through with each subsequent second directional click event, actuating each function accordingly. Available functions may be displayed 912 with some indication of the current selected function.

Where the input type is determined 902 to be a rotate up event or rotate down event, an adjustable parameter associated with the current selected function is identified 914 and altered 916, increasing or decreasing the magnitude of such adjustable parameter accordingly.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages. The form herein before described being merely an explanatory embodiment thereof, it is the intention of the following claims to encompass and include such changes.

What is claimed is:

1. A computer apparatus comprising:
 a display;
 an input device;
 at least one processor coupled to the display, the input device, and a memory storing processor executable code for configuring the at least one processor to:
  render a signal from one or more image sources on the display;
  receive an input from the input device;
  determine an input type from a list of input types comprising rotate up; rotate down; first directional click; second directional click; and depression click;
  increase an image brightness level of an image source when the at least one processor determines that the input is a rotate up input;
  decrease the image brightness level of the image source when the at least one processor determines that the input is a rotate down input;
  cycle through an ordered list of available image sources to define a current image source when the at least one processor determines that the input is a first directional click;
  identify a plurality of display altering functions associated with the current image source;
  cycle through the plurality of display altering functions when the input is a second directional click;
  remove the current image source from a composite image; and
  render the composite image.

2. The apparatus of claim 1, wherein the plurality of display altering functions comprise a contrast inversion.

3. The apparatus of claim 1, wherein the memory further stores processor executable code for configuring the at least one processor to:
 identify an adjustable parameter associated with the plurality of display altering functions;
 increase a magnitude of the adjustable parameter when the input is a rotate up input; and
 decrease the magnitude of the adjustable parameter when the input is a rotate down input.

4. The apparatus of claim 1, wherein the memory further stores processor executable code for configuring the at least one processor to cycle through an ordered list of available image sources to define a current image source when the processor determines that the input is a second directional click.

5. An aircraft display system comprising:
 a head-up display (HUD);
 an input device affixed to an aircraft yoke;
 at least one processor coupled to the HUD, the input device, and a memory storing processor executable code for configuring the at least one processor to:
  receive an input from the input device;
  determine an input type from a list of input types comprising rotate up; rotate down; first directional click; second directional click; and depression click;
  cycle the HUD between a displayed state and a non-displayed state when the at least one processor determines that the input is a depression click;
  cycle through an ordered list of available image sources, the available image sources providing portions of a composite image, to define a current image source when the at least one processor determines that the input is a first directional click;
  identify a plurality of display altering functions associated with the current image source;
  cycle through the plurality of display altering functions when the input is a second directional click;
  render a signal from the current image source on the HUD;
  remove the current image source from the composite image; and
  render the composite image.

6. The aircraft display system of claim 5, wherein the memory further stores processor executable code for configuring the at least one processor to:
 increase an image brightness level of an image source when the at least one processor determines that the input is a rotate up input; and decrease the image brightness level of the image source when the at least one processor determines that the input is a rotate down input.

7. The aircraft display system of claim 5, wherein the plurality of display altering functions comprise an infrared capability.

8. The aircraft display system of claim 5, wherein the memory further stores processor executable code for configuring the at least one processor to:
   identify an adjustable parameter associated with the plurality of display altering functions;
   increase a magnitude of the adjustable parameter when the input is a rotate up input; and
   decrease the magnitude of the adjustable parameter when the input is a rotate down input.

9. A method for adjusting features of a head-up display comprising:
   receiving, with a processor, an input from a thumb wheel input device configured to produce a rotate up input, a rotate down input, a first directional click; a second directional click; and a depression click;
   determining, with the processor, an input type from a list of input types comprising rotate up; rotate down; first directional click; second directional click; and depression click;
   cycling a head-up display (HUD) between a displayed state and a non-displayed state when the processor determines that the input is a depression click;
   rendering a signal from one or more image sources on the HUD;
   increasing an image brightness level of an image source when the processor determines that the input is a rotate up input;
   decreasing the image brightness level of the image source when the processor determines that the input is a rotate down input;
   cycling through an ordered list of available image sources to define a current image source when the processor determines that the input is a first directional click;
   identifying a plurality of display altering functions associated with the current image source;
   identifying an adjustable parameter associated with the plurality of display altering functions;
   cycling through the plurality of display altering functions when the input is a second directional click;
   increasing a magnitude of the adjustable parameter when the processor determines that the input is a rotate up input; and
   decreasing the magnitude of the adjustable parameter when the processor determines that the input is a rotate down input.

10. The method of claim 9, further comprising displaying an ordered list of display altering functions associated with the current image source.

11. The method of claim 9, wherein the plurality of display altering functions comprises a contrast inversion and infrared capability.

* * * * *